United States Patent [19]

Hostettler

[11] 4,287,307
[45] Sep. 1, 1981

[54] INTEGRAL SKIN MICROCELLULAR POLYESTER BASE POLYURETHANE ELASTOMERS

[75] Inventor: Fritz Hostettler, Freehold, N.J.

[73] Assignee: Plastics Technology Associates, Inc., Farmingdale, N.J.

[21] Appl. No.: 127,791

[22] Filed: Mar. 5, 1980

[51] Int. Cl.$^3$ ............................................. C08G 18/14
[52] U.S. Cl. ..................... 521/51; 36/25 R; 36/28; 36/32 R; 252/182; 252/426; 252/428; 252/430; 252/431 R; 260/31.8 XA; 260/33.2 R; 521/110; 521/111; 521/112; 521/114
[58] Field of Search .............. 521/114, 110, 111, 112, 521/51; 252/182, 426, 428, 430, 431 R; 260/31.8 XA, 33.2 R; 36/25 R, 28, 32 R

[56] References Cited

U.S. PATENT DOCUMENTS

| | | | |
|---|---|---|---|
| 3,824,199 | 7/1974 | Nadeau et al. | 521/51 |
| 3,882,072 | 5/1975 | Olstowski | 260/33.2 R |
| 4,065,410 | 12/1977 | Schäfer et al. | 521/51 |

Primary Examiner—Maurice J. Welsh
Attorney, Agent, or Firm—Curtis, Morris & Safford

[57] ABSTRACT

Synthesis of integral skin microcellular polyurethane elatomers by reacting hydroxyl-terminated aliphatic polyesters with symmetrical diisocyanates, prepolymers of these isocyanates such as derived from p,p'-diphenylmethane diisocyanate and an aliphatic glycol and mixtures thereof, these are polymerized in the presence of an organic blowing agent, and one or more plasticizers such as of the formulae

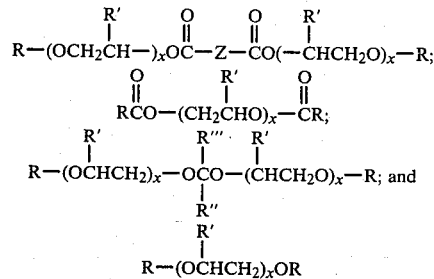

further enhancement of the results is brought about by the presence of catalysts and cell regulating agents, such as dimethylpolysiloxanes; the obtained elastomers are useful, such as for shoe soles and in the manufacture of other products, e.g., vibration dampening devices, floatation devices, gaskets and the like.

27 Claims, No Drawings

INTEGRAL SKIN MICROCELLULAR POLYESTER BASE POLYURETHANE ELASTOMERS

This invention relates to the synthesis of integral skin microcellular polyurethane elastomers. More particularly, this invention pertains to methods for obtaining and the products derived from the reaction products of hydroxyl-terminated aliphatic polyesters, isocyanate prepolymers from p,p'-diphenylmethane diisocyanate (or the isocyanate itself) and aliphatic glycols in the presence of specific plasticizers.

BACKGROUND FOR THIS ART

In the manufacture of microcellular polyurethane elastomers from polyesters for shoe soles, it has been virtually impossible to perfect a suitable technique for the molding of products which have an acceptable peripheral outer skin (integral skin). The manufacture of skins of this type is important for lacquering of soles to obain asthetically acceptable and durable products. Moreover, the skin should be impervious to water or oil, and should be free of surface blisters, voids, and other blemishes.

Most of the microcellular urethane elastomers are produced from a polyester and an isocyanate employing water or mixtures of water and organic solvents as blowing agents (reaction of water with isocyanate yields carbon dioxide), to obtain the desired expansion of the polymer to yield a product having a density of from about 20 to 50 lbs./cu. ft. (Specific gravity about 0.2 to 0.8 gm/cm$^3$). When water is used as the reactant for blowing, the resulting product is microporous up to and including the skin itself. This type of product is much more difficult to paint or coat because it contains a fairly porous surface, necessitating the use of sealing primers prior to painting.

The manufacture of integral-skin products has several advantages including direct paintability without primer, better flex life, because of higher resistance to growth from a cut inflicted in the dense skin (known as "cut growth"), much higher tear strength of the skin, and generally superior abrasion resistance.

It has been observed that during the reaction of polyethers, glycol chain extenders and aromatic polyisocyanates (for example prepolymers of p,p'-diphenylmethane diisocyanate), in the presence of fluorocarbon blowing agents and appropriate catalysts, it is feasible to manufacture integral-skin microcellular polyurethanes having suitable surfaces. Although these products are employed in the manufacture of shoe soles, these products are somewhat deficient in wear and abrasion resistance and also with respect to oil and solvent resistance. Consequently, these products are less useful, in general, and especially for athletic or work shoes than the polyester based products.

Prior to the present invention, the manufacture of integral-skin microcellular polyurethane elastomers from polyesters has been difficult (apart from the obtaining even of a satisfactory skin). Polymerization of polyesters, glycol chain extenders, and prepolymers from p,p'-diphenylmethane diisocyanate in the presence of fluorocarbon blowing agents and appropriate catalysts has caused many difficulties, since the resulting product has a normally closed cell structure and will shrink upon cooling. Cell control agents, such as polydimethyl siloxanes or polyphenylmethyl siloxanes, are helpful in this respect, as are mineral oils and crude oils, but these have had the disadvantage of yielding surface blemishes such as voids or craters near or just below the product surface.

BRIEF DESCRIPTION OF THE INVENTION

Microcellular or sponge polyurethane elastomers of the present invention are rubber-like materials made by the interaction of a polyol and an organic isocyanate, having cell diameters in the range from 0.3 to 0.001 mm, or less with a minimum density of 160 kg/m$^3$ (10 lbs./ft.$^3$).

A broad density range is from 160 to 900 kg/m$^3$, corresponding to a specific gravity of from 0.06 to 0.9 gm/cm$^3$; a preferred range is from 350 to 700 kg/m$^3$, corresponding to a specific gravity from 0.35 to 0.7 gm/cm$^3$.

The foam portion of the microcellular polyurethane elastomer should comprise a blown cell structure that has a minimum number of about 30-40 cells/cm to 1,000 cells/cm, or more. A preferred range is from 50 cells/cm to 500 cells/cm.

The elastomer's skin in the microcellular integralskin elastomer products of the present invention generally has a thickness of 0.5 to 4 mm, or more, preferably from 1-3 mm. The flex life, as measured by the Ross flex test (ASTM D-1052), or the de Mattia flex test (ASTM D-430), has been found to be extremely good, in comparison with microcellular polyurethane elastomers which are blown by the reaction of water with isocyanate (such products having no clearly defined integral-skin surface). The tear strength of the present integral-skin mircocellular polyuethane elastomer products, when measured according to ASTM D-625, as well as the abrasion resistance, when measured according to the Taber abrasion (ASTM D-3389), are also appreciably better in comparison with products prepared by blowing with carbon dioxide (water-isocyanate reaction).

The integral skin polyester polyurethane foam elastomer of this invention is obtained by a reaction of hydroxyl-terminated aliphatic polyesters with symmetrical diisocyanates, prepolymers of these isocyanates, such as p,p'-diphenylmethane diisocyanate and an aliphatic glycol and mixtures thereof. These isocyanates will be further described herein.

In order to accomplish the production of integral skin foam elastomers, the above reaction products are polymerized in the presence of an organic blowing agent, and one or more plasticizers having the following structures as depicted by formulae a, b, c, or d below:

a. A compound of the formula

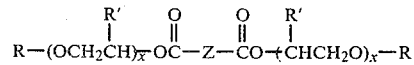

or mixtures thereof,
wherein R is alkyl having from 1 to 12 carbon atoms, R is aryl, alkylated aralkyl, and can be the same or different for each position, R' is H, methyl or ethyl, and in the compound may be any of the preceeding in each position, Z is alkylene (C$_2$ to C$_8$), such as ethylene, propylene, butylene, hexylene, octylene, etc., or any of the isomeric variations of these, for example, isopropylene, isobutylene, etc.; arylene, e.g., phenylene, chlorophenylene, tolylene, nitrophenylene, alkoxyphenylene, diphenylene, etc.; or aralkylene, e.g., xylylene, phenylethylene; or cycloakylene, e.g., cyclohexylene, and x is an integer of from 1 to 5.

Illustrative examples are di-methoxyethyl glutarate, di-methoxyethyl adipate, di-methoxyethyl sebacate, di-ethoxyethyl glutarate, di-ethoxyethyl adipate, di-ethoxyethyl azelate, di-butoxyethyl succinate, di-butoxyethyl glutarate, di-butoxyethyl adipate, di-butoxyethyl azelate, di-butoxyethyl sebacate, di-hexyloxyethyl adipate, di-2-ethylhexyloxyethyl adipate, di-butoxypropyl adipate, butoxypropyl butoxyethyl adipate, methoxypropyl butoxyethyl adipate, di-butoxyethyl phthalate, di-butoxyethyl isophthalate, di-butoxyethyl p-phenylenediacetate, di-butoxyethyl 3-methyl adipate, butoxyethyl, methoxypropyl adipate, methoxyethyl hexyloxypropyl adipate, di-methoxyethyleneoxyethyl adipate, di-butoxyethyleneoxyethyl glutarate, di-butoxypropyleneoxyethyl adipate, di-butoxyethyleneoxyethyl phthalate, and the like.

Among the compounds of the above formula a., a compound depicted by the following subgeneric formula has been found to be more advantageously employed in the method described herein (as well as for obtaining the desired end products):

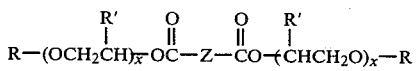

or mixtures thereof,
wherein R is alkyl of 2 to 6 carbon atoms, such as methyl, ethyl, isopropyl, butyl, amyl, isoamyl or hexyl, R' is preferably hydrogen or methyl, Z is alkylene of 4 to 10 carbon atoms; arylene such as phenylene or naphthylene; or aralkylene having phenylene or naphthylene in the arylene portions and from 2 to 4 carbon atoms in the alkylene portion, x is as defined above. Particularly desirable are the following: di-methoxyethyl, di-ethoxyethyl, and di-butoxyethyl dicarboxylates like glutarates, adipates, azelates, sebacates, phthalates, isophthalates and terephthalates and mixtures thereof.

It is also within the scope of this invention to utilize tricarboxylates, for example, trimellitates of the alkoxyethyl alcohols if desired alone or in admixture with the above-described dicarboxylates.

b. A compound of the formula

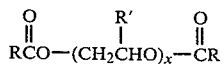

or mixtures thereof,
wherein R is alkyl having from 1 to 10 carbon atoms and may be the same or a different alkyl moiety for each position; aryl; substituted aryl; aralkyl; alkaryl; or cycloalkyl; R' is hydrogen, or alkyl such as methyl or ethyl, and in the compound may be any of the preceding in each position, and x is an integer from 2 to 10.

Among the compounds of the above formula b., a compound depicted by the following subgeneric formula has been found to be more advantageously employed in the method described herein (as well as for obtaining the desired end products)

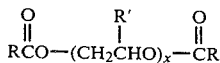

or mixtures thereof,
wherein R is alkyl of 5 to 11 carbon atoms such as pentyl, 2-methyl-hexyl, nonyl, undecyl; or phenyl, or chlorophenyl, or nitrophenyl, or dinitrophenyl, naphthyl, and the like, and x is an integer from 2 to 10.

R is preferably pentyl, 2-methylhexyl or phenyl, and R' is preferably hydrogen or methyl.

Illustrative compounds are, among others, the diesters of aliphatic and aromatic monocarboxylic acids with polyoxyalkylene glycols, for example, polyoxyethylene glycols and polyoxypropylene glycols, or mixed polyoxyethyleneoxypropylene glycols, or mixtures of these glycols.

Preferred compounds are the diesters of diethylene glycol, triethylene glycol and tetraethylene glycol and hexanoic acid, 2-ethylhexanoic acid and benzoic acid. Still further preferred compounds comprise diethylene glycol and dipropylene glycol benzoates known in the trade as Benzoflex plasticizers. Other preferred compounds comprise the diesters of tripropylene glycol and 2-ethylhexanoic acid and benzoic acid. (Benzoflex tradenamed products are available from Velsicol Chemicals Corp.)

It is further within the scope of the present invention to use triesters of monocarboxylic acids and trifunctional polyoxyalkylene triols, for example, the 2-ethylhexanoates of the ethylene or propylene oxide adducts of glycerol or trimethylolpropane having molecular weights of from about 200 to about 500.

c. An acetal or a ketal compound of the formula

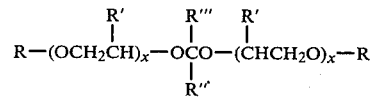

or mixtures thereof,
wherein R is alkyl from 1 to 12 carbon atoms, and may be the same or a different alkyl moiety for each position, such as methyl, ethyl, butyl, hexyl, 2-ethylhexyl, nonyl, dodecyl and the like; aryl such as phenyl, chlorophenyl, naphthyl and the like; alkanyl such as tolyl, ethylphenyl, xylyl, and the like; the cycloalkyl such as cyclohexyl and the like; R' is H, methyl, or ethyl and in the compound may be any of the preceding in each position: R'' and R''' are H, or alkyl from 1 to 4 carbon atoms; and x represents integers from 1 to 5.

Among the compounds of the above formula c., a compound depicted by the following subgeneric formula has been found to be more advantageously employed in the method described herein (as well as for obtaining desired end products):

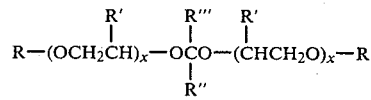

or mixtures thereof,
wherein R is alkyl of 1 to 8 carbon atoms, such as methyl, ethyl, butyl, hexyl, or 2-ethylhexyl; aryl such as phenyl, cresyl, or xylyl; aralkyl such as benzyl; or cycloalkylene such as cyclohexyl; R' is preferably hydrogen, methyl, or phenyl; R'' and R''' are preferably hydrogen or methyl; and x is from 1 to 5.

Particularly desirable compounds are the following: The formals from formaldehyde, the acetals from acetaldehyde, and the ketals from acetone or methylethyl ketone with the monoalkylether glycols of ethylene glycol, diethylene glycol, triethylene glycol, propylene glycol, dipropylene glycol, and mixtures thereof. The preferred monoalkylether glycols include methoxyethanol, methoxypropanol, methoxyethyleneoxyethanol (also called methoxydiglycol), methoxydipropylene glycol, ethoxyethanol, butoxyethanol, hexyloxyethanol, ethoxydiglycol, butoxydiglycol, hexyloxydiglycol, methoxytriglycol, ethoxytriglycol, butoxytriglycol, isopropoxypropylene glycol, butoxypropylene glycol, or butoxyethyleneoxyisopropanol. Still other glycol ethers of considerable interest are aryloxy glycols, for example, phenyloxyethanol and phenyloxydiglycol. The highly preferred aldehyde is formaldehyde. The formals are prepared by the acid-catalyzed reaction of aqueous formaldehyde with the above-identified glycol ethers. These methods are well known in the art.

d. A polyether compound of the formula

or mixtures thereof,
wherein R is alkyl from 1 to 12 carbon atoms, such as methyl, ethyl, isopropyl, butyl, hexyl, 2-ethylhexyl, nonyl, dodecyl, and the like; aryl such as phenyl, chlorophenyl, naphthyl, and the like; aralkyl such as benzyl, phenylethyl, and the like, alkaryl such as tolyl, xylyl, and the like; and cycloalkyl such as cyclohexyl, and the like; R' is H, methyl, ethyl, chloromethyl, and the like; and x is an integer from 1 to 10.

Illustrative examples are the alkyl and aryl diethers of ethylene or propylene glycols, diethylene and dipropylene glycols, triethylene and tripropylene glycols, tetraethylene glycol, and also higher homologues of these linear polyethers. Included as useful compounds are mixed polyethers comprising derivatives of ethylene and propylene oxide, or physical mixtures of these materials.

Preferred products are the alkyl diethers from diethylene glycol, dipropylene glycol, triethylene glycol, and tetraethylene glycol, having alkyl termination of methyl, ethyl, or butyl.

In a preferred embodiment of the invention, further enhancement of the results is brought about by the presence of catalysts and cell regulating agents (such as polydimethyl siloxanes and polyphenyl methyl siloxanes).

DISCUSSION OF THE INVENTION AND THE EMBODIMENTS THEREOF

Quite surprisingly, it has now been found that the addition of from 5–30 parts of the plasticizers or extenders described per 100 parts of the polyester polyol employed in the polyurethane reaction makes possible the formation of microcellular elastomers having excellent paintable surfaces such as is normally only experienced with polyethers. Other, more commonly known plasticizers such as dioctyl phthalate, tri-2-ethylhexyl phosphate, butoxyethyl oleate, and the like, cause the formation of large cells when employed in this process. Such products are not useful in the preparation of integral-skin microcellular elastomers from polyesters, although their presence in small amounts, for example, less than 5 parts per hundred parts of polyester can sometimes be tolerated.

Moreover, it has also been found that the presence of small amounts, for example, from 0.02 to 0.5% (based on all ingredients) or more, of a dimethyl polysiloxane has a synergistic effect, when used in combination with the plasticizer described above, in providing further benefits such as very even cell structure and minimized blemishes or voids on the skin surface. Thus, this addition of a silicone represents an advantageous embodiment of the method. Although these silicones yield surface imperfections in the absence of the plasticizer, it has surprisingly been found that these have a very beneficial effect upon the surface properties of these products when utilized in conjunction with the plasticizer.

In the formation of integral-skin microcellular polyurethane elastomers, it is believed that the skin is formed by compression of collapsed foam at the interphase between mold and polymer (over-fill of mold cavity in relation to free-blow of product). Consequently, to obtain a smooth boundary surface, a long gelation time, extending past the rise time of the foam is very desirable, since the skin boundary layer can be shaped more readily. It has been found that the plasticizers of the present invention are very efficient in this respect, bringing about, in fact, a surface which is essentially devoid of blemishes. Surprisingly, it has been observed that the combination of silicones and the plasticizers gives optimum results in this respect, resulting in a skin surface which is extremely suitable for painting. Moreover, the skin surface is essentially impermeable to water, which is a distinct advantage for the use of the microcellular polyurethane elastomers in footwear applications, floation devices, and the like.

a. Polymer Formation

The present invention is confined to the reaction of hydroxyl-terminated polyesters obtained from aliphatic glycols, dicarboxylic acids, hydroxy acids or lactones with aliphatic glycol chain extenders and polyisocyanates (as further defined herein), in the presence of organic blowing agents, and one or more of the plasticizers, extenders, and/or viscosity reducing agents described above.

The above-mentioned polyester may be formed by reacting glycols with dicarboxylic acids such as succinic acid (or anhydride), glutaric acid (or anhydride), adipic acid, pimelic acid, azelic acid, sebacic acid, and dimer acids. Dimer acids are defined as dimerized linoleic acid. It is also feasible to prepare the polyesters from hydroxy acids and lactones, for example, 6-hydroyhexanoic acid or epsilon-caprolactone.

The preparation of polyesters is more fully described in *High Polymers,* Volume XVI, Part I, Interscience Publishers; 1962; Pages 45–47. The preparation of polyesters from epsilon-caprolactones, zeta-enantholactone and others is described in U.S. Pat. Nos. 2,933,477 and 2,933,478.

Among the glycols utilized are $HO-(CH_2)_x-OH$, wherein $x = 2–10$, e.g., ethylene glycol, 1,4-butanediol, 1,6-hexanediol, 1,10-decanediol, and the like; polyoxyalkylene glycols such as diethylene glycol, dipropylene glycol, triethylene glycol, tripropylene glycol, tetraethylene glycol; propylene glycol, 1-thiodiglycol, 2-ethyl-1,3-hexanediol, neopentylene glycol, and the like. Preferred glycols are those specifically recited above.

It is also within the scope of the present invention to introduce small amounts of triols such as glycerol, trimethylolpropane and other polyhydric alcohols to obtain slightly branched polyesters. These products give slightly faster rate of polymer cure, while retaining excellent flex life for the integral-skin microcellular polyurethane elastomer. The number of hydroxyl groups available for reacting with the diisocyanate is preferably within the limits of 2.0 (linear polymer) to 2.5 (branched polymer), and highly preferably between the limits of 2.0 and 2.35, per mole of polyester Among the polyisocyanates suitable for the present invention are the symmetrical aliphatic, cycloaliphatic and aromatic diisocyanates themselves, mixtures of these diisocyanates and their carbodiimide derivatives, and in particular prepolymers of these diisocyanates. Moreover, mixtures of these prepolymers with the diisocyanates themselves and with their carbodiimides, are also contemplated.

Illustrative of the diisocyanates useful in the invention are 1,4-tetramethylene diisocyanate, 1,6-hexamethylene diisocyanate, the urea derivative of this isocyanate [$OCN(CN_2)_6NHCONH(CH_2)_6NCO$], methylene bis-(cyclohexyl isocyanate) (cis and trans isomers thereof), 4,4'-benzidine diisocyanate, 3,3'-dimethyl-4,4'-benzidine diisocyanate, p-phenylene diisocyanate, 1,5-naphthylene diisocyanate, 4,4'-diphenylmethane diisocyanate, 4,4'-diphenylmethane diisocyanate containing up to 25% of the 2,4'- and 2,2'-isomer, a liquid mixture of 4,4'-diphenylmethane diisocyanate and carbodiimides thereof, for example, Isonate 143-L (available from The Upjohn Company; U.S. Pat. No. 3,492,330), and mixtures of the above. The methods for the preparation of the above-described diisocyanates and a more comprehensive listing of symmetrical diisocyanates is presented by W. Siefken, in *Justus Liebigs Annalen der Chemie*, Volume 562, Pages 75-136.

Prepolymers suitable in the present process are prepared by reacting a portion of the diisocyanate with hydroxyl-terminated mono- or polyesters, or certain glycols or polyoxyalkylene glycols. Typical examples are products such as Isonate 226 and 240 (available from The Upjohn Company), both prepolymers being reaction products of a linear 2000 molecular weight copolyester of adipic acid, ethylene glycol and 1,4-butanediol, with Isonate 125M (available from The Upjohn Company; primarily 4,4'-diphenylmethane diisocyanate containing minor quantities of the 2,4'-and 2,2'-isomers), having isocyanate equivalents of about 220-226. Other examples of isocyanate prepolymers are reaction products of di- and tripropylene glycols, or mixtures thereof with 4,4'-diphenylmethane diisocyanates. Products of this type are Mondur PF (available from Mobay Chemicals) and Isonate 181 (available from The Upjohn Company). Both materials have isocyanate equivalent weights of about 180-185. Products of this type are described in U.S. Pat. No. 3,644,457. Other prepolymers based on diphenylmethane diisocyanates and polyoxyethylene glycols are described in U.S. Pat. No. 4,115,429.

The glycol chain extenders which are useful in the present invention are particularly alkanediols HO-$(CH_2)_n$OH, wherein n=2-10, e.g., ethylene glycol, 1,3-propanediol, 1-4-butanediol, 1,5-pentanediol, 1,6-hexanediol, 1,10-decanediol, and the like. Other glycols that are suitable include diethylene glycol, thiodiglycol, triethylene glycol, tetraethylene glycol, p-xylylenediol, quinitol, neopentylene glycol, dihydroxyethyl hydroquinone, and mixtures thereof, and the like. Ethylene glycol, 1,4-butanediol and 1,6-hexanediol are preferred extenders.

The organic blowing agents that are particularly suitable for the purpose of the present invention are halogenated hydrocarbons, in particular fluorocarbons such as trichlorofluoromethane, 1,1-difluoro-1-chloro-2-fluoro-2-dichloro-ethane, difluorodichloromethane, and mixtures of the same and the like halogenated hydrocarbons. It is also feasible to use mixtures of low boiling hydrocarbons, ethers, and ketones with halogenated hydrocarbons.

Catalyts which are employed for the purpose of accelerating the chemical reactions include tertiary amines, metallic catalysts and combinations thereof. Typical amine catalysts include tertiary amines, such as triethylamine, tributylamine, N-methyl morpholine, N-ethyl morpholine, N-cocomorpholine, N,N,N',N'-tetramethyl ethylenediamine, 1,4-diazabicyclo-(2,2,2,)-octane, N-methyl-N'-dimethyl amino ethyl piperazine, N,N-dimethyl benzylamine, bis-(N,N-diethylaminoethyl)adipate, N,N-diethyl benzylamine, pentamethyl diethylene triamine, N,N-dimethyl cyclohexylamine, N,N,N',N'-tetramethyl-1,3-butanediamine, N,N-dimethyl-betaphenylethyl amine, 1,2-dimethylimidazole and 2-methylimidazole. Other suitable catalysts are known Mannich bases of secondary amines, such as dimethyl amine, and aldehydes, preferably formaldehyde, or ketones, such as acetone, methylethyl ketone, cyclohexanone, and phenols, such as phenol, nonyl phenol and bis-phenol.

Tertiary amines containing isocyanate-reactive hydrogen atoms may also be used as catalysts and include triethanolamine, triisopropanolamine, N-methyl diethanolamine, N-ethyl diethanolamine, N,N-dimethyl ethanolamine, also their reaction products with alkylene oxides, such as propylene oxide, and/or ethylene oxide.

Other suitable catalysts are sila-amines with carbon-silicon bonds of the type described, for example, in U.S. Pat. No. 3,620,984. Specific examples include 2,2,4-trimethyl-2-silamorpholine and 1,3-diethylaminomethyl tetramethyl disiloxane.

It is also possible to use as catalysts nitrogen-containing bases, such as tetraalkyl ammonium hydroxides, alkali metal hydroxides, such as sodium hydroxide, alkali metal phenolates, such as sodium phenolate, or alkali metal alcoholates, such as sodium methylate. Hexahydrotriazines may also be used as catalysts.

According to the invention, organometallic compounds and more especially organo tin compounds and organo mercury compounds may also be used as catalysts.

Preferred organotin compounds include tin (II) salts of carboxylic acids, such as tin (II) acetate, tin (II) octoate, tin (II) ethyl hexoate and tin (II) laurate, and tin (IV) compounds such as dibutyl tin oxide, dibutyl tin dichloride, dibutyl tin diacetate, dibutyl tin dilaurate, dibutyl tin maleate or dioctyl tin diacetate. It is of course possible to use any of the above-mentioned catalysts in the form of mixtures. Organic mercury catalysts are described in U.S. Pat. No. 3,642,044.

Further representatives of catalysts suitable for use in accordance with the invention and information on the way in which these catalysts work, may be found in Kunststoff-Handbuch, Vol. VII, by Vieweg and Hochtlen, Carl-Hanser-Verlag, Munich 1966, for example, on pages 96 to 102.

The catalysts employed can vary from 0.01 to 1%, by weight, or more based upon the weight of the polyurethane formed. Preferred range is from 0.1 to 0.5%, by weight.

According to the invention, it is also possible to use surface-active additives, such as emulsifiers and foam stabilizers. Examples of suitable emulsifiers include the sodium salts of caster oil sulphonates or salts of fatty acids with amines, such as diethylamine oleate or diethanolamine stearate. Alkali metal or ammonium salts of sulphonic acids, for example, of dodecyl benzene sulphonic acid or dinaphthyl methane disulphonic acid, or of fatty acids, such as ricinoleic acid or of polymeric fatty acids may also be used as surface-active additives.

Suitable foam stabilizers include polyether siloxanes, especially those which are water-soluble. These compounds are generally synthesized in such a way that a copolymer of ethylene oxide and propylene oxide is attached to a polydimethyl siloxane radical. Foam stabilizers of this type are described, for example, in U.S. Pat. Nos. 2,834,748; 2,917,480; and 2,629,308.

Further ingredients which are very useful are cell regulating agents, as previously mentioned, are such as poly dimethyl siloxanes having viscosities of from about 5 to about 100 centistokes at 25° C., preferably from about 5 to about 50 centistokes at 25° C.; poly phenyl methyl siloxanes like the products described in U.S. Pat. No. 4,042,537; mineral oils; polyether polyols comprising copolymers and block copolymers of ethylene and propylene oxides, and the like.

The polyether polyols can be linear or branched copolymers and block copolymers having molecular weights of from 1000 or lower to 6000 or higher. The preferred polyether polyols are linear copolymers and block copolymers having molecular weights of from 2000 to 3500. They can be utilized in proportions from 1 to as high as 20 parts per 100 parts of the polyester polyols described above. These polyether polyols can also be advantageously used with the silicone fluids described below in various proportions in an effective amount to control the cell size as described herein.

The highly preferred products are the poly dimethyl siloxanes having viscosities of from about 5 to about 20 centistokes at 25° C. Examples of these products include the DC 200 fluids (available from Dow Corning Corporation) and the L-45 fluids (available from Union Carbide Corporation), having viscosities of from as low as about 5 to 100 centistokes at 25° C., and also Dow Corning fluid DCF-1-1630, having a viscosity of about 5 centistokes at 25° C. (the viscosity being an indicator of the molecular weight of these silicon fluids). DC 200 fluid 5 cs has a molecular weight of 680, 10 cs oil corresponds to 1000, 20 cs to 1600, 50 cs to 3200, and 100 cs to 5000 molecular weight.

b. Illustrations of the Plasticizers and Viscosity Reducers

A variety of plasticizers has been tested for the present purpose. It has been found that compounds containing ether oxygens in the molecule function particularly well. Plasticizers containing alkyl groups (dioctyl phthalate, oleates, tri-octyl-phosphates, etc.) cause the formation of large cells, and are not suitable.

The plasticizers which perform well are required to be soluble in the polyester forming the polyurethane. Moreover, it has been observed that these plasticizers facilitate formation of a more miscible polyester-glycol extender blend. These plasticizers are generally also compatible with the isocyanate prepolymer. Another advantage imparted by the presence of plasticizers is their ability to reduce the viscosity of the polyol reactant mixture. Their presence improves the flow of materials drastically, bringing about capability of molding intricate shoe sole patterns and the like.

As an example of the suitable plasticizers, those investigated were, among others, esters of dicarboxylic acids described for formula a. above, i.e., wherein the reaction products are esters such as glutarates, adipates, azelates, sebacates, and phthalates. These are further shown in Examples 1 and 2. Several of the plasticizers tested are compounds of the formula b. These compounds are diesters of short chain alkanoic acids and polyoxyalkylene glycols, generally polyoxyethylene glycols. These are also exemplified in Examples 1 and 2.

Another exemplified plasticizer is a compound of formula c. and is a formal derived from formaldehyde and butyl "Cellosolve" (butoxyethanol). Other formals, for example, the product derived from butyl "Carbitol" (butoxyethoxyethanol) fall within that class of useful plasticizers.

Still another plasticizer that has shown considerable merit in this invention is a compound of formula d. and is the dibutylether or tetraethylene glycol.

DESCRIPTION OF TEST METHODS

The following test methods have been used to determine physical properties. The description found in the appropriate ASTM manual applies except as noted below:

Tear Strength:
Determined in accordance with ASTM D-624. Die C.

Tensile Strength:
Determined in accordance with ASTM D-412. Method A.

Flex Testing:
Determined in accordance with ASTM D-1052, except as noted below:
Ageing was for 18 hours at 60° C. Specimens were then held at room temperature for 72 hours prior to testing. Preparation of sample differs from ASTM D-1052 in that a "TEXON" insole material was cemented to the specimen to increase the stress on the hole made with the piercing tool. The "TEXON" material is (available from Texon, Inc., South Hadley, MA.) 0.070 inches in thickness and must be cemented to the entire 1×6 inch surface of the specimen. The "TEXON" is always cemented to the uppermost molded surface of the plaque. Cementing should be done with a heat activated urethane adhesive applied to both the "TEXON" and the specimen in accordance with the manufacturers' recommendations. The report is most desirable when a cut growth of less than 100% occurs in 30,000 cycles at room temperature.

Abrasion:
Determination in accordance with ASTM D-3389, except as noted below:
The Taber abrader was used with a type H-22 abrasive wheel. The load on the specimen was 1 kilogram. The vacuum was used throughout the test. Specimens were cut from molded plaques of approximately ½ inch in thickness with smooth and parallel surfaces. The side tested was always the down side, or the inside surface of the mold cavity. The procedure used conditions the surface of the specimens by exposing it to 1,000 revolutions before weights are taken to begin the test. Following the abrasion of the initial 1,000 cycles, 5,000 cycles are run, under the 1 kilo load, after which determinations are made.

Hardness:

Determined in accordance with ASTM D-2240, Durometer Shore A.

Inasmuch as a number of components in this invention have been identified by their trade names, for the sake of convenience, these are tabulated herein and their chemical structure or composition further amplified so that any of these components can be readily obtainable or made by those of ordinary skill in the art.

| Trade Designation | Identification of Component(s) and source of same: |
|---|---|
| RUCOFLEX F-2403 Polyester | Hooker Chemical & Plastics Company, Ruco Division; A diethylene glycol-glycerol-adipate, having a degree of branching of about 2.35, a hydroxyl number of 42.7, an acid number of 0.4, and an equivalent weight of about 1300. Note: Degree of branching has been explained previously. |
| METASOL 57 DPG | Merck Chemical Division, Merck & Co., Inc.; A 20% solution of phenylmercuric propionate in dipropylene glycol. |
| DCF-1-1630 | Dow Corning Corporation; A dimethyl-polysiloxane having a viscosity of 5 centistokes at 25° C. Other products which could be used are the dimethyl-polysiloxanes known as DC-200 fluids having a viscosity of 10, 20, 50, and 100 centistokes or higher. |
| L-45, 10 cs | Union Carbide Corporation; A dimethyl-polysiloxane silicone fluid having a viscosity of 10 centistokes at 25° C. Other L-45 homologues having a viscosity of 20, 50, and 100 centistokes at 25° C. are also useful. |
| FLEXOL PLASTICIZER 4GO | Union Carbide Corporation; Tetraethylene glycol di-2-ethylhexanoate. |
| FLEXOL PLASTICIZER 3GH | Union Carbide Corporation; Triethylene glycol di-hexanoate. |
| FLEXOL PLASTICIZER TOF | Union Carbide Corporation; Tri-2-ethylhexyl phosphate. |
| PLASTICIZER TP 90B | Thiokol Corporation; Formal from Butyl Cellosolve ($C_4H_9OC_2H_4OH$) and formaldehyde. |
| T52N50 | Cincinnati Milacron Chemicals, Inc.; A 50% solution of a dibutyltin dicarboxylate in dioctyl phthalate. The tin concentration is 10.0%, by weight, of tin. |
| FOMREZ UL-1 | Witco Chemical Corp., Organics Division; A delayed action catalyst complex of a proprietary dibutyltin derivative; freezing point −15° C., specific gravity at 25° C. of 1.01; water-white to pale yellow liquid. |
| WHITE PASTE 3100 | Pigment Dispersions, Inc.; A white paste dispersion designed for polyurethane foams. |
| BLACK PASTE 1800 | Pigment Dispersions, Inc.; A black paste dispersion designed for polyurethane foams. |
| BROWN DYE | Ciba Geigy Corporation, Dyestuff and Chemical Division; The brown dye was prepared by admixing equal amounts, by weight of ORASOL 2 GLN Yellow and ORASOL 2 GL Brown. |
| RUCOFLEX S-1011-35 | Hooker Chemicals & Plastic Company, Ruco Division; A linear homologous series of hydroxyl-terminated polyester diols and based on adipic acid and diethylene glycol, with a hydroxyl number of about 35, an |

-continued

| Trade Designation | Identification of Component(s) and source of same: | |
|---|---|---|
| | acid number of about 0.5, and an equivalent weight of about 1580. | |
| TINUVIN 770 | Ciba Geigy Corporation, Plastics and Additives Division; The product is described in U.S. Pat. No. 3,640,928. | |
| IRGANOX 1010 | Ciba Geigy Corporation, Plastics and Additives Division; The product is described in U.S. Pat. Nos. 3,285,855 and 3,644,482. | |
| BABCO | Air Products and Chemicals, Inc.; The granular product utilized was 1,4-diazobicyclo-(2.2.2)octane. | |
| THANCAT DD | Jefferson Chemical Company; The product utilized is predominantly bis (3-dimethyl-aminopropyl) ether. | |
| TP 759 | Thiokol Corporation; An ether-ester plasticizer exhibiting the following typical properties: | |
| | Specific Gravity @ 77° F. (25° C.) | 1.032 |
| | Refractive Index @ 77° F. (25° C.) | 1.142 |
| | Viscosity cps. @ 77° F. (25° C.) | 25 |
| | Moisture % | 0.2 |
| | Flash Point (ASTM-D-73-73)°F.(°C.) | 338° F. (170° C.) |
| | Fire Point (ASTM-D-73-73)°F.(°C.) | 409.6° F. (192° C.) |
| | Volatility % loss after 2 hrs. (ASTM-D-22-88) @ 311° F.(155° C.) | 0.72 |
| PLASTHALL 7050 | The C. P. Hall Company; A diester of glutaric anhydride and a monoallylether of a glycol having the following typical analysis: | |
| | Physical Form | Liquid |
| | Specific Gravity @ 25° C. | 1.069 |
| | Pounds/Gallon | 8.9 |
| | Viscosity @ 25° C., 20 RPM, Spindle #1 | 40cps |
| | Freezing Point | Below −60° C. |
| | Color, Gardner | 3–4 |
| | Flash Point | 380° F. |
| | Fire Point | 410° F. |
| TEGMER 804 | The C. P. Hall Company; Diester of tetraethylene glycol and 2-ethyl-hexanoic acid. | |
| ISONATE 181 | The Upjohn Company; A prepolymer of a mixture of di- and tripropylene glycols and 4,4'-diphenylmethane diisocyanate, having an isocyanate content of about 23% NCO. | |
| ISONATE 226 | The Upjohn Company; A prepolymer comprising the reaction product of about 40 parts, by weight, of a difunctional copolyester of adipic acid, ethylene glycol and 1,4-butanediol having a molecular weight of about 2000, and about 60 parts, by weight, of 4,4'-diphenylmethane diisocyanate, and having an iso-cyanate content of about 18.8%, by weight, an isocyanate equivalent of about 223, and a viscosity at 30° C. of about 625 centipoises. | |
| ISONATE 240 | The Upjohn Company; A prepolymer comprising the reaction product of about 40 parts, by weight, of a difunctional copolyester of adipic acid, ethylene glycol and 1,4-butanediol having a molecular weight of about 2000, and about 60 parts, by weight, of 4-4'-diphenylmethane, diisocyanate, and having an isocyanate content of about 18.8%, by weight, an isocyanate equivalent of about 223, and a viscosity at 30° C. of about 1000 centipoises. The product crystallizes below 15° C. | |
| FREON 11B | E. I. du Pont de Nemours Company; A stabilized version of trichloro- | |

-continued

| Trade Designation | Identification of Component(s) and source of same: |
|---|---|
| | monofluoromethane. |
| RUCOFLEX F-2408 Polyester | Hooker Chemicals & Plastics Co., Ruco Division; A diethylene glycol-glycerol adiphate having a degree of branching of about 2.2, a hydroxyl number of about 50.9, an acid number of about 0.4, and an equivalent weight of about 1100. |
| UCC FLEXOL EPO | Epoxidized soybean oil available from Union Carbide Corporation. |
| UCC FLEXOL LOE | Epoxidized linseed oil available from Union Carbide Corporation. |
| ROHM & HAAS G-54 | PARAPLEX G-54 is an intermediate molecular weight polyester plasticizer available from Rohm & Haas Company. |
| ROHM & HAAS G-56 | PARAPLEX G-56 is an intermediate molecular weight polyester plasticizer available from Rohm & Haas Company. |
| PLASTICIZER C-503 | Butyl oleate available from The C. P. Hall Company. |
| KRONITEX 50 | A synthetic triaryl phosphate plasticizer available from The C. P. Hall Company. |
| PLASTICIZER C-498 | Dioctyl azelate available from The C. P. Hall Company. |
| PLASTICIZER C-494 | Di-2-ethyl-hexyl sebacate available from The C. P. Hall Company. |
| KRONITEX 100 | Triisopropylphenyl phosphate plasticizer available from The C. P. Hall Company. |
| KRONITEX TXP | Trixylenyl phosphate plasticizer available from The C. P. Hall Company. |

In the tables herein, the following terms of art which are being used are defined below:

| Cream Time | The start of the foaming reaction. |
|---|---|
| Rise Time | Completion of the foaming reaction. |
| Tack Free Time | When the reacted polymer will no longer stick to the fingers when touched. |
| Snap Time | When the reacted polymer can no longer be separated when pinched between two fingers and pulled. |
| Free Blowing Density | The density in lbs./ft.$^3$ of a foam that is allowed to rise in an open cup and is determined by cutting the cap of the foam flush with top of the cup and using the following equation: $\left(\dfrac{\text{weight of foam and cup} - \text{weight of cup}}{\text{cc of cup}}\right) \times 62.43 = \text{lbs./ft.}^3$ |
| Molded Density | The molded density is expressed in terms of grams per cubic centimeter (gm/cc.), and is measured on the molded item by means of volume displacement with a liquid. |

The following examples will help to illustrate the invention still further and show the embodiments thereof.

EXAMPLE 1

A series of experiments comprising the manufacture of microcellular polyurethanes from a diethylene glycol adipate polyester (Rucoflex 2403), ethylene glycol extender and an isocyanate prepolymer Isonate 181 (The Upjohn Company) were conducted to test the suitability of a variety of plasticizers. A series of experiments is described in Table I. As is apparent from the results, only the products described in the formulae a, b, and c defined above appear to be operative. It is also noted that these plasticizers are all compatible with the polyester, and that these greatly facilitate miscibility of the ethylene glycol with the polyester-plasticizer mix.
**further identified above The addition of a polydimethylsiloxane of 10 centistokes viscosity, namely L-45 (10 cs) (Union Carbide Corporation) results in even better, more uniform products.

Conversely, the other plasticizers tested are insufficiently compatible with the polyester-glycol mixture, and all these lead to very large cells or cell collapse.

A group of plasticizers (TP 90B, Plast Hall 7050, butoxyethyl phthalate, and butoxyethyl adipate) were all foamed in combination with the polyurethane precursors on a foaming machine, and excellent shoe sole products, which could readily be painted were prepared. These are described in experiments further disclosed herein. (cf. Table III)
**further identified above

TABLE I

| FORMULATIONS: | 1 | 2 | 3 | 4 | 5 | 6 | 7 | 8 | 9 | 10 | 11 |
|---|---|---|---|---|---|---|---|---|---|---|---|
| RUCOFLEX 2403 Polyester** | 91.5 | 91.5 | 91.5 | 91.5 | 91.5 | 91.5 | 91.5 | 91.5 | 91.5 | 91.5 | 91.5 |
| Ethylene Glycol | 10.0 | 10.0 | 10.0 | 10.0 | 10.0 | 10.0 | 10.0 | 10.0 | 10.0 | 10.0 | 10.0 |
| DABCO** | 0.35 | 0.35 | 0.35 | 0.35 | 0.35 | 0.35 | 0.35 | 0.35 | 0.35 | 0.35 | 0.35 |
| THANCAT DD** | 0.15 | 0.15 | 0.15 | 0.15 | 0.15 | 0.15 | 0.15 | 0.15 | 0.15 | 0.15 | 0.15 |

TABLE I-continued

| | | | | | | | | | | | |
|---|---|---|---|---|---|---|---|---|---|---|---|
| METASOL 57 DPG** | 0.7 | 0.7 | 0.7 | 0.7 | 0.7 | 0.7 | 0.7 | 0.7 | 0.7 | 0.7 | 0.7 |
| L-45,10 CS** | — | 0.2 | — | 0.2 | — | 0.2 | — | 0.2 | — | 0.2 | — |
| FLEXOL Plasticizer 4GO** | — | — | 20.0 | 20.0 | — | — | — | — | — | — | — |
| FLEXOL Plasticizer 3GH** | — | — | — | — | 20.0 | 20.0 | — | — | — | — | — |
| FLEXOL Plasticizer TOF** | — | — | — | — | — | — | 20.0 | 20.0 | — | — | — |
| Dioctyl Phthalate | — | — | — | — | — | — | — | — | 20.0 | 20.0 | — |
| TP90B Plasticizer** | — | — | — | — | — | — | — | — | — | — | 20.0 |
| TP759 Plasticizer** | — | — | — | — | — | — | — | — | — | — | — |
| PLASTHALL 7050** | — | — | — | — | — | — | — | — | — | — | — |
| Dibutoxyethyl Phthalate | — | — | — | — | — | — | — | — | — | — | — |
| Dibutoxyethyl Adipate | — | — | — | — | — | — | — | — | — | — | — |
| Dibutoxyethyl Glutarate | — | — | — | — | — | — | — | — | — | — | — |
| Dibutoxyethyl Azelate | — | — | — | — | — | — | — | — | — | — | — |
| Dibutoxyethyl Sebacate | — | — | — | — | — | — | — | — | — | — | — |
| Tegmer 804** | — | — | — | — | — | — | — | — | — | — | — |
| Butoxyethyl Laurate | — | — | — | — | — | — | — | — | — | — | — |
| Butoxyethyl Oleate | — | — | — | — | — | — | — | — | — | — | — |
| FREON 11B** | 10.0 | 10.0 | 10.0 | 10.0 | 10.0 | 10.0 | 10.0 | 10.0 | 10.0 | 10.0 | 10.0 |
| ISONATE 181** | 73.3 | 73.3 | 73.3 | 73.3 | 73.3 | 73.3 | 73.3 | 73.3 | 73.3 | 73.3 | 73.3 |
| Index | 1.00 | 1.00 | 1.00 | 1.00 | 1.00 | 1.00 | 1.00 | 1.00 | 1.00 | 1.00 | 1.00 |
| Free Blow Density (lbs./ft.$^3$) | 5.5 | 7.0 | 6.7 | 7.1 | 6.4 | 6.7 | NA | 11.7 | 8.9 | 9.6 | 6.9 |
| Cream Time (sec.) | 16 | 16 | 18 | 16 | 17 | 16 | 24 | 22 | 25 | 17 | 16 |
| Rise Time (sec.) | 46 | 46 | 60 | 56 | 58 | 56 | C | 56 | 75 | 60 | 36 |
| Tack Free (sec.) | 56 | 56 | 63 | 56 | 75 | 75 | O | 63 | 75 | 60 | 56 |
| Snap Time (sec.) | 67 | 65 | 85 | 87 | 108 | 100 | L | 70 | 80 | 70 | 106 |
| Cells per Cm | >40 | >40 | >40 | >40 | >50 | >50 | LAPSE | <8 | <5 | <8 | >40 |
| Average Cell Size (sq.mm) | 0.05 | 0.05 | 0.05 | 0.05 | 0.03 | 0.03 | | 1.2 | 3.0 | 1.2 | 0.05 |
| Observations | 1* | 1* | 2* | 2* | 2* | 2* | | 3* | 4* | 3* | 2* |

1* Partially closed cells. Tight foam.
2* Open cell foam. Good structure.
3* Large cells. Foam structure not suitable for molding.
4* Very large cells. Foam structure not suitable for molding.
**These components are defined above.
Note: NA - Collapsed, could not measure density.

| FORMULATIONS: | 12 | 13 | 14 | 15 | 16 | 17 | 18 | 19 | 20 | 21 | 22 |
|---|---|---|---|---|---|---|---|---|---|---|---|
| RUCOFLEX 2403 Polyester** | 91.50 | 91.50 | 91.50 | 91.50 | 91.50 | 91.50 | 91.50 | 91.50 | 91.50 | 91.50 | 91.50 |
| Ethylene Glycol | 10.0 | 10.0 | 10.0 | 10.0 | 10.0 | 10.0 | 10.0 | 10.0 | 10.0 | 10.0 | 10.0 |
| DABCO** | 0.35 | 0.35 | 0.35 | 0.35 | 0.35 | 0.35 | 0.35 | 0.35 | 0.35 | 0.35 | 0.35 |
| THANCAT DD** | 0.15 | 0.15 | 0.15 | 0.15 | 0.15 | 0.15 | 0.15 | 0.15 | 0.15 | 0.15 | 0.15 |
| L-45, 10 cs** | | | | | | | | | | | |
| FLEXOL Plasticizer 4GO** | — | — | — | — | — | — | — | — | — | — | — |
| FLEXOL Plasticizer 3GH** | — | — | — | — | — | — | — | — | — | — | — |
| FLEXOL Plasticizer TOF** | — | — | — | — | — | — | — | — | — | — | — |
| Dioctyl Phthalate | — | — | — | — | — | — | — | — | — | — | — |
| TP9OB Plasticizer** | 20.0 | — | — | — | — | — | — | — | — | — | — |
| TP759 Plasticizer** | — | 20.0 | 20.0 | — | — | — | — | — | — | — | — |
| PLASTHALL 7050** | — | — | — | 20.0 | 20.0 | — | — | — | — | — | — |
| Dibutoxyethyl Phthalate | — | — | — | — | — | 20.0 | 20.0 | — | — | — | — |
| Dibutoxyethyl Adipate | — | — | — | — | — | — | — | 20.0 | 20.0 | — | — |
| Dibutoxyethyl Glutarate | — | — | — | — | — | — | — | — | — | 20.0 | 20.0 |
| Dibutoxyethyl Azelate | — | — | — | — | — | — | — | — | — | — | — |
| Dibutoxyethyl Sebacate | — | — | — | — | — | — | — | — | — | — | — |
| Tegmer 804** | — | — | — | — | — | — | — | — | — | — | — |
| Butoxyethyl Laurate | — | — | — | — | — | — | — | — | — | — | — |
| Butoxyethyl Oleate | — | — | — | — | — | — | — | — | — | — | — |
| FREON 11B** | 10.0 | 10.0 | 10.0 | 10.0 | 10.0 | 10.0 | 10.0 | 10.0 | 10.0 | 10.0 | 10.0 |
| ISONATE 181** | 73.3 | 73.3 | 73.3 | 73.3 | 73.3 | 73.3 | 73.3 | 73.3 | 73.3 | 73.3 | 73.3 |
| Index | 1.00 | 1.00 | 1.00 | 1.00 | 1.00 | 1.00 | 1.00 | 1.00 | 1.00 | 1.00 | 1.00 |
| Free Blow Density (lbs./ft.$^3$) | 7.5 | 6.6 | 6.8 | 7.1 | 6.4 | 6.8 | 6.6 | 6.9 | 7.1 | 7.0 | 6.9 |
| Cream Time (sec.) | 16 | 11 | 13 | 13 | 14 | 14 | 18 | 16 | 16 | 17 | 16 |
| Rise Time (sec.) | 34 | 58 | 58 | 44 | 48 | 48 | 56 | 56 | 55 | 48 | 50 |
| Tack Free (sec.) | 56 | 60 | 60 | 56 | 60 | 69 | 70 | 80 | 75 | 65 | 69 |
| Snap Time (sec.) | 106 | 100 | 104 | 102 | 104 | 110 | 108 | 112 | 98 | 100 | 100 |
| Cells per Cm | >50 | >55 | >55 | >45 | >50 | >50 | >55 | >40 | >50 | >50 | >50 |
| Average Cell size (sq. mm) | 0.03 | 0.025 | 0.025 | 0.04 | 0.03 | 0.03 | 0.25 | 0.05 | 0.03 | 0.03 | 0.03 |
| Observations | 2* | 2* | 2* | 2* | 2* | 2* | 2* | 2* | 2* | 2* | 2* |

2* Open cell foam. Good structure

| FORMULATIONS: | 23 | 24 | 25 | 26 | 27 | 28 | 29 | 30 | 31 | 32 |
|---|---|---|---|---|---|---|---|---|---|---|
| RUCOFLEX 24 03 Polyester** | 91.50 | 91.50 | 91.50 | 91.50 | 91.50 | 91.50 | 91.50 | 91.50 | 91.50 | 91.50 |
| Ethylene Glycol | 10.0 | 10.0 | 10.0 | 10.0 | 10.0 | 10.0 | 10.0 | 10.0 | 10.0 | 10.0 |
| DABCO** | 0.35 | 0.35 | 0.35 | 0.35 | 0.35 | 0.35 | 0.35 | 0.35 | 0.35 | 0.35 |
| THANCAT DD** | 0.15 | 0.15 | 0.15 | 0.15 | 0.15 | 0.15 | 0.15 | 0.15 | 0.15 | 0.15 |
| METASOL 57 DPG** | 0.70 | 0.70 | 0.70 | 0.70 | 0.70 | 0.70 | 0.70 | 0.70 | 0.70 | 0.70 |
| L-45, 10 CS** | — | 0.20 | — | 0.20 | — | 0.20 | — | 0.20 | — | 0.20 |
| FLEXOL Plasticizer 4GO | — | — | — | — | — | — | — | — | — | — |

TABLE I-continued

| | | | | | | | | | | |
|---|---|---|---|---|---|---|---|---|---|---|
| FLEXOL Plasticizer 3GH | — | — | — | — | — | — | — | — | — | — |
| FLEXOL Plasticizer TOF | — | — | — | — | — | — | — | — | — | — |
| Dioctyl Phthalate | — | — | — | — | — | — | — | — | — | — |
| TP90B Plasticizer | — | — | — | — | — | — | — | — | — | — |
| TP759 Plasticizer | — | — | — | — | — | — | — | — | — | — |
| PLASTHALL 7050 | — | — | — | — | — | — | — | — | — | — |
| Dibutoxyethyl Phthalate | — | — | — | — | — | — | — | — | — | — |
| Dibutoxyethyl Adipate | — | — | — | — | — | — | — | — | — | — |
| Dibutoxyethyl Glutarate | — | — | — | — | — | — | — | — | — | — |
| Dibutoxyethyl Azelate | 20.0 | 20.0 | — | — | — | — | — | — | — | — |
| Dibutoxyethyl Sebacate | — | — | 20.0 | 20.0 | — | — | — | — | — | — |
| Tegmer 804 | — | — | — | — | 20.0 | 20.0 | — | — | — | — |
| Butoxyethyl Laurate | — | — | — | — | — | — | 20.0 | 20.0 | — | — |
| Butoxyethyl Oleate | — | — | — | — | — | — | — | — | 20.0 | 20.0 |
| FREON 11B** | 10.0 | 10.0 | 10.0 | 10.0 | 10.0 | 10.0 | 10.0 | 10.0 | 10.0 | 10.0 |
| ISONATE 181** | 73.3 | 73.3 | 73.3 | 73.3 | 73.3 | 73.3 | 73.3 | 73.3 | 73.3 | 73.3 |
| Index | 1.00 | 1.00 | 1.00 | 1.00 | 1.00 | 1.00 | 1.00 | 1.00 | 1.00 | 1.00 |
| Free Blow Density (lbs.ft.$^3$) | 7.1 | 6.7 | 6.6 | 6.8 | 7.3 | 6.8 | NA | NA | NA | NA |
| Cream Time (sec.) | 17 | 18 | 18 | 18 | 18 | 19 | 35 | 30 | 26 | 28 |
| Rise Time (sec.) | 52 | 58 | 65 | 65 | 70 | 69 | 75 | Col-lapsed | Col-lapsed | Col-lapsed |
| Tack Free (sec.) | 112 | 75 | 80 | 78 | 100 | 75 | 76 | | | |
| Snap Time (sec.) | 130 | 112 | 120 | 120 | 150 | 150 | 87 | | | |
| Cells per Cm | >40 | >40 | >40 | >50 | >60 | >40 | <8 | | | |
| Average Cell size (sq. mm) | 0.05 | 0.05 | 0.05 | 0.03 | 0.05 | 0.05 | | | | |
| Observations | 2* | 2* | 2* | 2* | 2* | 2* | 5* 6* | 7* | 7* | 7* |

2* Open cell foam. Good structure.
5* Did not rise to the top of the cup. Large cells.
6* Not suitable for molding.
7* Plasticizer does not appear compatible.
NOTE:NA-Collapsed, could not measure density

EXAMPLE 2

In this example, a series of foams from Rucoflex 2044, an ethylene glycol-1,4-butanediol-glycerol adipate, having a functionality of about 2.3, a hydroxyl number of 40.7, a carboxyl number of 0.2, and an equivalent weight of about 1370, 1,4-butanediol extender and Isonate 226** prepolymer were foamed as described in Table II. The four plasticizers tested give excellent open-cell foam, and the resulting product have a very strong skin. A typical product, similar to Formulation No. 10 was foamed on a molding machine, and excellent shoe soles were made. The specific results are given in a separate experiment.

These experiments are described in Table II.

The functionality of the polyester polymer is expressed as the number of hydroxyl groups per molecule of polyester, i.e., Rucoflex 2044**, having an equivalent weight of about 1370 (by analysis), has a moledular weight of about 3150 and contains about 2.3 hydroxyl units per gram mole (39.1 gm OH).

** further identified above

TABLE II

RUCOFLEX 2044/1,4-BUTANEDIOL/ISONATE 226.

| FORMULATIONS | 1 | 2 | 3 | 4 | 5 | 6 | 7 | 8 | 9 | 10 |
|---|---|---|---|---|---|---|---|---|---|---|
| RUCOFLEX 2044 Polyester** | 82.50 | 82.50 | 82.50 | 82.50 | 82.50 | 82.50 | 82.50 | 82.50 | 82.50 | 82.50 |
| 1,4-Butanediol | 18.9 | 18.9 | 18.9 | 18.9 | 18.9 | 18.9 | 18.9 | 18.9 | 18.9 | 18.9 |
| Triethylenediamine | 0.25 | 0.25 | 0.25 | 0.25 | 0.25 | 0.25 | 0.25 | 0.25 | 0.25 | 0.25 |
| N,N-Dimethylbenzylamine | 0.35 | 0.35 | 0.35 | 0.35 | 0.35 | 0.35 | 0.35 | 0.35 | 0.35 | 0.35 |
| METASOL 57 DPG** | 0.75 | 0.75 | 0.75 | 0.75 | 0.75 | 0.75 | 0.75 | 0.75 | 0.75 | 0.75 |
| DCF-1-1630** | — | 0.20 | — | 0.20 | — | 0.20 | — | 0.20 | — | 0.20 |
| TP90B Plasticizer** | — | — | — | — | — | — | — | — | 20.0 | 20.0 |
| PLASTHALL 7050** | — | — | 20.0 | 20.0 | — | — | — | — | — | — |
| Dibutoxyethyl Phthalate | — | — | — | — | — | — | 20.0 | 20.0 | — | — |
| Dibutoxyethyl Adipate | — | — | — | — | 20.0 | 20.0 | — | — | — | — |
| FREON 11B | 10.0 | 10.0 | 10.0 | 10.0 | 10.0 | 10.0 | 10.0 | 10.0 | 10.0 | 10.0 |
| ISONATE 226** | 109 | 109 | 109 | 109 | 109 | 109 | 109 | 109 | 109 | 109 |
| Index | 1.0 | 1.0 | 1.0 | 1.0 | 1.0 | 1.0 | 1.0 | 1.0 | 1.0 | 1.0 |
| Free Blow Density (lbs./ft.$^3$) | 9.6 | 7.5 | 8.5 | 8.2 | 9.1 | 8.4 | 9.3 | 8.3 | 10.2 | 8.9 |
| Cream Time (sec.) | 23 | 21 | 20 | 23 | 23 | 22 | 22 | 20 | 20 | 21 |
| Rise Time (sec.) | 50 | 46 | 50 | 48 | 50 | 52 | 48 | 46 | 48 | 52 |
| Tack Free (sec.) | 55 | 46 | 50 | 50 | 50 | 52 | 58 | 48 | 56 | 58 |
| Snap Time (sec.) | 160 | 120 | 210 | 210 | 180 | 180 | 150 | 150 | 180 | 200 |
| Cells per Inch (Approx.) | 200 | 200 | 100 | 100 | 80 | 80 | 80 | 80 | 80 | 80 |
| Average Cell Size (sq. mm) | 0.07 | 0.07 | 0.25 | 0.25 | 0.40 | 0.40 | 0.40 | 0.40 | 0.40 | 0.40 |
| Observations | 1* | 2* | 3* | 3* | 3* | 3* | 3* | 3* | 3* | 3* |

1* Many closed cells, tight foam.
2* Open cells, slightly tight foam.
3* Very open cells, good foam.
NOTE:
F-1630 gives a product of somewhat lower density. The plasticizer and the poly dimethyl siloxane are synergists.
**These components have been defined above.

EXAMPLE 3

The following formulations were foamed on a two-stream commercial foaming machine, and shoe soles and test plaques were molded. Table III describes the results of these tests. All tests proved very successful. The plasticizer level was varied from 10 to 30 parts per 100 parts of polyester-glycol mix. All shoe soles are readily paintable with commercial lacquers by means of dipping, spraying, or any combinations thereof.

the foam machine is held at between 20°–45° C., preferably between 25°–35° C.

Test specimens were tested after keeping them under ambient conditions for one week.

TABLE III

PHYSICAL PROPERTIES OF VARIOUS FOAMS OBTAINED IN A SERIES OF MACHINE RUNS

| FORMULATIONS: | A | B | C | D | E | F | G | H | I | J |
|---|---|---|---|---|---|---|---|---|---|---|
| RUCOFLEX F2403** | — | 92.50 | 91.50 | 89.00 | 89.00 | 89.00 | 80.00 | 91.50 | 91.50 | 91.50 |
| RUCOFLEX S-1011-35** | 91.00 | — | — | — | — | — | — | — | — | — |
| Ethylene Glycol | 10.5 | 8.9 | 10.0 | 12.4 | 12.4 | 12.4 | 12.4 | 9.9 | 9.9 | 9.9 |
| Triethylenediamine | 0.35 | 0.25 | 0.35 | 0.25 | 0.25 | 0.25 | 0.25 | 0.25 | 0.25 | 0.25 |
| N,N,N',N'-Tetramethylbutanediamine | 0.35 | 0.35 | 0.35 | 0.35 | 0.35 | 0.35 | 0.35 | 0.35 | 0.35 | 0.35 |
| CARSTAN T52N50** | — | — | — | — | — | — | 0.03 | — | — | — |
| FOMREZ UL-1** | — | 0.01 | — | — | — | — | — | — | — | — |
| DCF-1-1630** | 0.20 | 0.20 | 0.20 | 0.20 | 0.20 | 0.20 | 0.20 | 0.20 | 0.20 | 0.20 |
| TP 90B Plasticizer** | 20.00 | 20.00 | 10.00 | — | — | — | — | — | — | — |
| PLASTHALL 7050** | — | — | — | 10.00 | 20.00 | 30.00 | — | 10.00 | 20.00 | 30.00 |
| Dibutoxyethyl Phthalate | — | — | — | — | — | — | 20.00 | — | — | — |
| FREON 11B | 10.00 | 10.00 | 10.00 | 10.00 | 10.00 | 10.00 | 10.00 | 10.00 | 10.00 | 10.00 |
| White Paste 3100** | — | 3.00 | — | — | — | — | 3.00 | — | — | — |
| Black Paste 1800** | 2.00 | — | — | — | — | — | — | — | — | — |
| Brown Dye** | — | — | 0.02 | 0.02 | 0.02 | 0.02 | — | 0.02 | 0.02 | 0.02 |
| IRGANOX 1010** | — | 0.30 | — | — | — | — | 0.30 | — | — | — |
| TINUVIN 770** | — | 0.50 | — | — | — | — | 0.50 | — | — | — |
| Dilaurylthiodipropionate | — | — | — | — | — | — | 0.30 | — | — | — |
| ISONATE 181** | — | 69.00 | — | — | — | — | — | 75.00 | 75.00 | 73.00 |
| ISONATE 226** | 92.00 | — | 90.00 | 109.00 | 109.00 | 109.00 | 106.00 | — | — | — |
| Index | 1.00 | 1.00 | 1.02 | 1.02 | 1.02 | 1.02 | 1.02 | 1.02 | 1.02 | 1.02 |
| Density (grams/cc) | 0.51 | 0.50 | 0.51 | 0.48 | 0.51 | 0.50 | 0.49 | 0.51 | 0.50 | 0.52 |
| Cream Time (sec.) | 13 | 15 | 11 | 11 | 13 | 11 | 12 | 9 | 9 | 13 |
| Rise Time (sec.) | 42 | 45 | 36 | 42 | 52 | 46 | 38 | 42 | 35 | 50 |
| Tack Free (sec.) | 48 | 60 | 50 | 50 | 54 | 52 | 43 | 50 | 50 | 95 |
| Snap Time (sec.) | 150 | 100 | 75 | 98 | 165 | 225 | 100 | 90 | 85 | 105 |
| Tensile Strength, psi (ASTM D-412-75) | 508 | 369 | 549 | 656 | 342 | 267 | 547 | 499 | 562 | 385 |
| Elongation, % (ASTM D-412-75) | 350 | 395 | 415 | 400 | 300 | 310 | 400 | 320 | 370 | 390 |
| Tear Strength, pli (ASTM D-624-73) | 157 | 95 | 158 | 146 | 94 | 68 | 130 | 94 | 119 | 77 |
| Ross Flex, % Cut Growth @ 30,000 cycles | | | | | | | | | | |
| 25° C. | 0 | 0 | 0 | 0 | 0 | 0 | 0 | 0 | 0 | 0 |
| −20° C. | F @ 12,700 | F @ 18,700 | 0 | 0 | 0 | 0 | 0 | F @ 13,600 | F @ 17,500 | F @ 30,000 |
| Hardness, Shore A (ASTM D-2240-75) | 57 | 55 | 55 | 70 | 60 | 55 | 65 | 65 | 65 | 50 |

F = Failure
**These components have been identified above.

EXAMPLE 4

In this experiment the difference between a fluorocarbon blown integral-skin microcellular polyurethane elastomer, and the corresponding carbon dioxide blown system, i.e., water-isocyanate reaction, is demonstrated. It should be noted that the water blown product has appreciably higher loss on abrasion, and it has also significantly lower tear strength in comparison with the fluorocarbon blown system.

The following experiments were conducted on a two-component foam machine from The Martin Sweets Company Louisville, Ky. The test specimens were cast into an epoxy molding having dimensions of 6"×8"×0.5". The mold was held at a temperature of 50°–55° C.

For the purpose of the present process, it is feasible to operate at mold temperatures of from about 25° to 75° C. or higher, a preferred temperature range is from 45°–60° C. The temperature of the reactant streams in

| FORMULA: | Experiment # | |
|---|---|---|
| | 4A | 4B |
| Ingredients | | |
| RUCOFLEX F-2408 Polyester** | 89.1 | 89.1 |
| Ethylene Glycol | 10.9 | 10.9 |
| Plasticizer TP-90B** | 10.0 | 10.0 |
| DABCO** | 0.4 | 0.4 |
| N,N,N',N'-Tetramethyl-1,1,3-butanediamine | 0.4 | 0.4 |
| Polyetherpolysiloxane | 0.3 | 0.3 |
| FREON-11** | 9.0 | — |
| Water | — | 0.35 |
| F-1-1630 (Dow Corning)** | 0.2 | 0.2 |
| ISONATE 240** | 100.2 | 108.9 |
| Physical Characteristics | | |
| Density gm/cc | 0.6 | 0.58 |
| Tensile Strength, psi | 690 | 550 |
| Elongation, % | 480 | 420 |
| Tear Strength, pli | 160 | 110 |
| Taber Abrasion, mg loss, 5,000 Cycles | 176 | 450 |

**further identified above

The following tables illustrate further studies and point out successful application of the inventive concept as well as the delineation of same from the unworkable or marginally process wise, passable, but unacceptable, (prior art) plasticizers.

TABLE IV

HAND FOAM STUDY OF VARIOUS PLASTICIZERS USING RUCOFLEX 2403/ETHYLENE GLYCOL/ISONATE 181

|  | 1 | 2 | 3 | 4 | 5 | 6 | 7 |
|---|---|---|---|---|---|---|---|
| COMPOSITION: | | | | | | | |
| RUCOFLEX 2403 | 91.50 | 91.50 | 91.50 | 91.50 | 91.50 | 91.50 | 91.50 |
| Ethylene Glycol | 10.00 | 10.00 | 10.00 | 10.00 | 10.00 | 10.00 | 10.00 |
| DABCO | 0.35 | 0.35 | 0.35 | 0.35 | 0.35 | 0.35 | 0.35 |
| THANCAT DD | 0.25 | 0.25 | 0.25 | 0.25 | 0.25 | 0.25 | 0.25 |
| Metasol 57DPG | 0.70 | 0.70 | 0.70 | 0.70 | 0.70 | 0.70 | 0.70 |
| FREON 11B | 10.00 | 10.00 | 10.00 | 10.00 | 10.00 | 10.00 | 10.00 |
| UCC FLEXOL EPO | — | — | 20.00 | 20.00 | — | — | — |
| UCC FLEXOL LOE | — | — | — | — | 20.00 | 20.00 | — |
| Rohm & Haas G54 | — | — | — | — | — | — | 20.00 |
| DCF-1-1630 | — | 0.20 | — | 0.20 | — | 0.20 | — |
| Dioctyl Adipate | 20.00 | 20.00 | — | — | — | — | — |
| Isonate 181 | 73.20 | 73.20 | 73.20 | 73.20 | 73.20 | 73.20 | 73.20 |
| Index | 1.0 | 1.0 | 1.0 | 1.0 | 1.0 | 1.0 | 1.0 |
| Free blow density lbs./ft.$^3$ | NA | NA | NA | NA | NA | NA | NA |
| CURE RATES: | | | | | | | |
| Cream Time (sec.) | 25 | 25 | 19 | 18 | 15 | 17 | 17 |
| Rise Time (sec.) | C | C | C | C | 48 | 50 | 50 |
| Tack Free Time (sec.) | O | O | O | O | 49 | 60 | 50 |
| Snap Time (sec.) | L | L | L | L | 98 | 180 | 60 |
| Cells per cm | L | L | L | L | NA | NA | <3 |
| Cell size (sq. mm.) | A | A | A | A | NA | NA | >8 |
|  | P | P | P | P | Closed Cells Tight Foam Shrinks | Closed Cells Tight Foam Shrinks | Open & Large Cells Not suitable for molding |
|  | S | S | S | S | | | |
|  | E | E | E | E | | | |
|  | D | D | D | D* | | | |

|  | 8 | 9 | 10 | 11 | 12 | 13 | 14 |
|---|---|---|---|---|---|---|---|
| COMPOSITION: | | | | | | | |
| RUCOFLEX 2403 | 91.50 | 91.50 | 91.50 | 91.50 | 91.50 | 91.50 | 91.50 |
| Ethylene Glycol | 10.00 | 10.00 | 10.00 | 10.00 | 10.00 | 10.00 | 10.00 |
| DABCO | 0.35 | 0.35 | 0.35 | 0.35 | 0.35 | 0.35 | 0.35 |
| THANCAT DD | 0.25 | 0.25 | 0.25 | 0.25 | 0.25 | 0.25 | 0.25 |
| Metasol 57DPG | 0.70 | 0.70 | 0.70 | 0.70 | 0.70 | 0.70 | 0.70 |
| FREON 11B | 10.00 | 10.00 | 10.00 | 10.00 | 10.00 | 10.00 | 10.00 |
| Rohm & Haas G54 | 20.00 | — | — | — | — | — | — |
| Rohm & Haas G56 | — | 20.00 | 20.00 | — | — | — | — |
| Dimethyl phthalate | — | — | — | 20.00 | 20.00 | — | — |
| Diethyl phthalate | — | — | — | — | — | 20.00 | 20.00 |
| DCF-1-1630 | 0.20 | — | 0.20 | — | 0.20 | — | 0.20 |
| Isonate 181 | 73.20 | 73.20 | 73.20 | 73.20 | 73.20 | 73.20 | 73.20 |
| Index | 1.0 | 1.0 | 1.0 | 1.0 | 1.0 | 1.0 | 1.0 |
| Free blow density lbs./ft.$^3$ | 9.30 | NA | NA | NA | NA | NA | NA |
| CURE RATES: | | | | | | | |
| Cream Time (sec.) | 15 | 15 | 17 | 17 | 17 | 15 | 15 |
| Rise Time (sec.) | 50 | 53 | 53 | 52 | 54 | 60 | 60 |
| Tack Free Time (sec.) | 50 | 55 | 54 | 81 | 60 | 60 | 60 |
| Snap Time (sec.) | 75 | 90 | 75 | 135 | 135 | 90 | 95 |
| Cells per cm | <8 | NA | NA | NA | NA | NA | NA |
| Cell size (sq. mm.) | >4-5 | NA | NA | NA | NA | NA | NA |
|  | Open & Large Cells Not suitable for molding | Closed Cells Tight Foam Shrinks | Closed Cells Tight Foam Shrinks | Closed Cells Tight Foam Shrinks | Closed Cells Tight Foam Shrinks | Closed Cells Tight Foam Shrinks | Closed Cells Tight Foam Shrinks |

NA-Not available due to collapse or shrinkage.
*Turns yellow at the start of mixing.

TABLE V

CONTINUATION OF HAND FOAM STUDY OF VARIOUS PLASTICIZERS USING RUCOFLEX 2403/ETHYLENE GLYCOL/ISONATE 181

| TEST RUN | 1' | 2' | 3' | 4' | 5' | 6' | 7' | 8' | 9' | 10' | 11' |
|---|---|---|---|---|---|---|---|---|---|---|---|
| RUCOFLEX Polyester F2403 | 91.50 | 91.50 | 91.50 | 91.50 | 91.50 | 91.50 | 91.50 | 91.50 | 91.50 | 91.50 | 91.50 |
| Ethylene Glycol | 10.00 | 10.00 | 10.00 | 10.00 | 10.00 | 10.00 | 10.00 | 10.00 | 10.00 | 10.00 | 10.00 |
| DABCO | 0.35 | 0.35 | 0.35 | 0.35 | 0.35 | 0.35 | 0.35 | 0.35 | 0.35 | 0.35 | 0.35 |
| THANCAT DD | 0.25 | 0.25 | 0.25 | 0.25 | 0.25 | 0.25 | 0.25 | 0.25 | 0.25 | 0.25 | 0.25 |
| METASOL 57DPG | 0.70 | 0.70 | 0.70 | 0.70 | 0.70 | 0.70 | 0.70 | 0.70 | 0.70 | 0.70 | 0.70 |

TABLE V-continued
CONTINUATION OF HAND FOAM STUDY OF VARIOUS PLASTICIZERS USING RUCOFLEX 2403/ETHYLENE GLYCOL/ISONATE 181

| | | | | | | | | | | | |
|---|---|---|---|---|---|---|---|---|---|---|---|
| DCF-1-1630 | 0.20 | — | 0.20 | — | 0.20 | — | 0.20 | — | 0.20 | — | 0.20 |
| C.P. HALL | | | | | | | | | | | |
| Plasticizer C-503 | — | 20.0 | 20.0 | — | — | — | — | — | — | — | — |
| Plasticizer KRONITEX 50 | — | — | — | 20.0 | 20.0 | — | — | — | — | — | — |
| Plasticizer C-498 | — | — | — | — | 20.0 | 20.0 | — | — | — | — | — |
| Plasticizer C-494 | — | — | — | — | — | — | 20.0 | 20.0 | — | — | — |
| Ditridecyl Phthalate | — | — | — | — | — | — | — | — | 20.0 | 20.0 | |
| FREON 11B | 10.0 | 10.0 | 10.0 | 10.0 | 10.0 | 10.0 | 10.0 | 10.0 | 10.0 | 10.0 | 10.0 |
| ISONATE 181 | 72.0 | 72.0 | 72.0 | 72.0 | 72.0 | 72.0 | 72.0 | 72.0 | 72.0 | 72.0 | 72.0 |
| Index | 1.0 | 1.0 | 1.0 | 1.0 | 1.0 | 1.0 | 1.0 | 1.0 | 1.0 | 1.0 | 1.0 |
| Free Blow Density (lbs./ft.$^3$) | 5.86 | N/A | N/A | 5.54 | 5.99 | N/A | N/A | N/A | N/A | N/A | N/A |
| Cream Time (sec.) | 16 | 30 | 30 | 17 | 19 | 26 | 25 | 25 | 26 | 26 | 24 |
| Rise Time (sec.) | 50 | 45 | 45 | 65 | 53 | 40 | 56 | 38 | 49 | 30 | 46 |
| Tack Free Time (sec.) | 50 | 50 | 55 | 70 | 75 | 50 | 60 | 50 | 50 | 50 | 55 |
| Snap Time (sec.) | 75 | 75 | 75 | 95 | 90 | 80 | 90 | 90 | 95 | 70 | 80 |
| Cells Per cm | >50 | C | C | >30 | >50 | C | C | C | C | C | C |
| Average Cell Size(sq. mm) | 0.03 | O | O | 0.06 | 0.03 | O | O | O | O | O | O |
| | | L | L | | | L | L | L | L | L | L |
| Observations | 2* | L | L | 2* | 3* | L | L | L | L | L | L |
| | | A | A | | | A | A | A | A | A | A |
| | | P | P | | | P | P | P | P | P | P |
| | | S | S | | | S | S | S | S | S | S |
| | | E | E | | | E | E | E | E | E | E |
| TEST RUN | 12' | 13' | 14' | 15' | 16' | 17' | 18' | 19' | 20' | 21' | 22' |

| | | | | | | | | | | |
|---|---|---|---|---|---|---|---|---|---|---|
| RUCOFLEX Polyester F2403 | 91.50 | 91.50 | 91.50 | 91.50 | 91.50 | 91.50 | 91.50 | 91.50 | 91.50 | 91.50 |
| Ethylene Glycol | 10.00 | 10.00 | 10.00 | 10.00 | 10.00 | 10.00 | 10.00 | 10.00 | 10.00 | 10.00 |
| DABCO | 0.35 | 0.35 | 0.35 | 0.35 | 0.35 | 0.35 | 0.35 | 0.35 | 0.35 | 0.35 |
| THANCAT DD | 0.25 | 0.25 | 0.25 | 0.25 | 0.25 | 0.25 | 0.25 | 0.25 | 0.25 | 0.25 |
| METASOL 57DPG | 0.70 | 0.70 | 0.70 | 0.70 | 0.70 | 0.70 | 0.70 | 0.70 | 0.70 | 0.70 |
| DCF-1-1630 | — | 0.20 | — | 0.20 | — | 0.20 | — | 0.20 | — | 0.20 | — |
| C.P. HALL Plasticizer | | | | | | | | | | |
| Tricresyl Phosphate (TCP) | 20.0 | 20.0 | — | — | — | — | — | — | — | — |
| Tributyl Phosphate (TBP) | — | — | 20.0 | 20.0 | — | — | — | — | — | — |
| Trioctyl Trimellitate (TOTM) | — | — | — | — | 20.0 | 20.0 | — | — | — | — |
| Dibutyl Phthalate | — | — | — | — | — | — | 20.0 | 20.0 | — | — |
| Diisodecyl Phthalate | — | — | — | — | — | — | — | — | 20.0 | 20.0 |
| Kronitex 100 | — | — | — | — | — | — | — | — | — | 20.0 |
| FREON 11B | 10.0 | 10.0 | 10.0 | 10.0 | 10.0 | 10.0 | 10.0 | 10.0 | 10.0 | 10.0 |
| ISONATE 181 | 72.0 | 72.0 | 72.0 | 72.0 | 72.0 | 72.0 | 72.0 | 72.0 | 72.0 | 72.0 |
| Index | 1.0 | 1.0 | 1.0 | 1.0 | 1.0 | 1.0 | 1.0 | 1.0 | 1.0 | 1.0 |
| Free Blow Density(lbs./ft.$^3$) | 7.13 | 6.37 | 6.11 | 6.62 | N/A | N/A | 5.48 | 6.69 | N/A | N/A | 6.3 |
| Cream Time (sec.) | 20 | 18 | 18 | 20 | 25 | 25 | 21 | 20 | 20 | 24 | 15 |
| Rise Time (sec.) | 55 | 57 | 55 | 60 | 37 | 55 | 58 | 60 | 40 | 50 | 53 |
| Tack Free Time (sec.) | 75 | 77 | 70 | 75 | 60 | 60 | 75 | 65 | 50 | 60 | 55 |
| Snap Time (sec.) | 100 | 98 | 105 | 110 | 75 | 75 | 100 | 90 | 60 | 75 | 75 |
| Cells Per cm | <9 | >50 | <6 | <9 | C | C | 80 | >50 | C | C | >55 |
| | | | | | O | O | | | O | O | |
| Average Cell Size(sq.) | 1.0 | 0.03 | 2.50 | 1.0 | L | L | 0.060 | 0.030 | L | L | 0.025 |
| Observations | 3* | 2* | 3* | 3* | L | L | 2* | 2* | L | L | 2* |
| | | | | | A | A | | | A | A | |
| | | | | | P | P | | | P | P | |
| | | | | | S | S | | | S | S | |
| | | | | | E | E | | | E | E | |
| TEST RUN | 23' | 24' | 25' | 26' | 27' | 28' | 29' | 30' | 31' | 32' | |

| | | | | | | | | | | |
|---|---|---|---|---|---|---|---|---|---|---|
| RUCOFLEX Polyester F2403 | 91.50 | 91.50 | 91.50 | 91.50 | 91.50 | 91.50 | 91.50 | 91.50 | 91.50 | |
| Ethylene Glycol | 10.00 | 10.00 | 10.00 | 10.00 | 10.00 | 10.00 | 10.00 | 10.00 | 10.00 | |
| DABCO | 0.35 | 0.35 | 0.35 | 0.35 | 0.35 | 0.35 | 0.35 | 0.35 | 0.35 | |
| THANCAT DD | 0.25 | 0.25 | 0.25 | 0.25 | 0.25 | 0.25 | 0.25 | 0.25 | 0.25 | |
| METASOL 57DPG | 0.70 | 0.70 | 0.70 | 0.70 | 0.70 | 0.70 | 0.70 | 0.70 | 0.70 | |
| DCF-1-1630 | 0.20 | — | 0.20 | — | 0.20 | — | 0.20 | — | 0.20 | — |
| C.P. HALL Plasticizer | | | | | | | | | | |
| Kronitex 100 | 20.0 | — | — | — | — | — | — | — | — | |
| Butyl Stearate (C-895) | — | 20.0 | 20.0 | — | — | — | — | — | — | |
| Diallyl Phthalate (DAP) | — | — | — | 20.0 | 20.0 | — | — | — | — | |
| Diisooctyl Phthalate | — | — | — | — | — | 20.0 | 20.0 | — | — | |
| Kronitex TXP | — | — | — | — | — | — | — | 20.0 | 20.0 | — |
| Diisodecyl Adipata (DIDA) | — | — | — | — | — | — | — | — | 20.0 | |
| FREON 11B | 10.0 | 10.0 | 10.0 | 10.0 | 10.0 | 10.0 | 10.0 | 10.0 | 10.0 | |
| ISONATE 181 | 72.0 | 72.0 | 72.0 | 72.0 | 72.0 | 72.0 | 72.0 | 72.0 | 72.0 | |
| Index | 1.0 | 1.0 | 1.0 | 1.0 | 1.0 | 1.0 | 1.0 | 1.0 | 1.0 | |
| Free Blow Density(lbs./ft.$^3$) | 6.69 | N/A | N/A | 6.12 | 6.24 | N/A | N/A | 7.58 | 7.7 | N/A |
| Cream Time (sec.) | 20 | 26 | 20 | 15 | 15 | 27 | 25 | 22 | 23 | 30 |
| Rise Time (sec.) | 60 | 40 | 45 | 58 | 60 | 60 | 50 | 55 | 60 | 48 |
| Tack Free Time (sec.) | 75 | 55 | 50 | 65 | 80 | 60 | 60 | 65 | 62 | 59 |
| Snap Time | 100 | 70 | 70 | 75 | 110 | 80 | 80 | 90 | 90 | 75 |
| | | C | C | | | C | C | | | C |
| Cells Per cm | >55 | O | O | >30 | >50 | O | O | >25 | >30 | O |
| Average Cell Size(sq. mm.) | 0.25 | L | L | 0.60 | 0.30 | L | L | 1.00 | 0.60 | L |
| | | L | L | | | L | L | | | L |

TABLE V-continued
CONTINUATION OF HAND FOAM STUDY OF VARIOUS PLASTICIZERS
USING RUCOFLEX 2403/ETHYLENE GLYCOL/ISONATE 181

| Observations | 2* | APSE | APSE | 2* | 2* | APSE | APSE | 2* | 2* | APSE |
|---|---|---|---|---|---|---|---|---|---|---|
| TEST RUN | 33' | 34' | 35' | 36' | 37' | 38' | 39' | 40' | 41' | |
| RUCOFLEX Polyester F2403 | 91.50 | 91.50 | 91.50 | 91.50 | 91.50 | 91.50 | 91.50 | 91.50 | 91.50 | |
| Ethylene Glycol | 10.00 | 10.00 | 10.00 | 10.00 | 10.00 | 10.00 | 10.00 | 10.00 | 10.00 | |
| DABCO | 0.35 | 0.35 | 0.35 | 0.35 | 0.35 | 0.35 | 0.35 | 0.35 | 0.35 | |
| THANCAT DD | 0.25 | 0.25 | 0.25 | 0.25 | 0.25 | 0.25 | 0.25 | 0.25 | 0.25 | |
| METASOL 57DPG | 0.70 | 0.70 | 0.70 | 0.70 | 0.70 | 0.70 | 0.70 | 0.70 | 0.70 | |
| DCF-1-1630 | 0.20 | — | 0.20 | — | 0.20 | — | 0.20 | — | 0.20 | |
| C.P. HALL Plasticizer | | | | | | | | | | |
| Diisodecyl Adipate (DIDA) | 20.0 | — | — | — | — | — | — | — | — | |
| Tributoxyethyl Phosphate (KP 140) | — | 20.0 | 20.0 | — | — | — | — | — | — | |
| Diisobutyl Adipate(C-642) | — | — | — | 20.0 | 20.0 | — | — | — | — | |
| Dibutyl Sebacate(C-392) | — | — | — | — | — | 20.0 | 20. | — | — | |
| N-Octyl N-Decyl Adipate | — | — | — | — | — | — | — | 20.0 | 20.0 | |
| FREON 11B | 10.0 | 10.0 | 10.0 | 10.0 | 10.0 | 10.0 | 10.0 | 10.0 | 10.0 | |
| ISONATE 181 | 72.0 | 72.0 | 72.0 | 72.0 | 72.0 | 72.0 | 72.0 | 72.0 | 72.0 | |
| Index | 1.0 | 1.0 | 1.0 | 1.0 | 1.0 | 1.0 | 1.0 | 1.0 | 1.0 | |
| Free Density Blow(lbs./ft.$^3$) | N/A | 7.26 | 6.56 | 7.64 | 8.47 | N/A | N/A | N/A | N/A | |
| Cream Time (sec.) | 31 | 20 | 19 | 24 | 25 | 32 | 32 | 32 | 32 | |
| Rise Time (sec.) | 52 | 55 | 58 | 70 | 70 | 70 | 78 | 50 | 60 | |
| Tack Free Time (sec.) | 55 | 74 | 75 | 70 | 71 | 75 | 80 | 55 | 60 | |
| Snap Time (sec.) | 75 | 105 | 101 | 100 | 100 | 100 | 90 | 75 | 90 | |
| Cells Per cm | COLLAPSE | >50 | >50 | <8 | <20 | — | — | COLLAPSE | COLLAPSE | |
| Average Cell Size(sq. mm.) | | 0.03 | 0.030 | 4.0 | 0.80 | — | — | | | |
| Observations | | 2* | 2* | 3* | 3* | 4* | 4* | | | |

2* Open Cell Foam. Good structure.
3* Large Cells. Foam structure not suitable for molding.
4* Very Large Cells. Foam structure not suitable for molding.

When utilizing the present invention for making soles, either of two commonly employed sole making processes are satisfactory. In one process, the left and right foot soles are cast as plaques, removed from the cast, and then attached to the shoe uppers by a suitable adhesive. In the other process, the shoe uppers, i.e., left and right foot, are presented as one mold surface and the resin is cast in the mold cavity defined by the shoe uppers and the mold walls. In either case, the molds are closed wall molds so as to obtain the mold defined sole shape. This sole shape may not necessarily be smooth (although it is typically so), but may have built in mold ridges such as for resiliency, cushioning, etc.

In either process, the typical adhesives (also called "cement") for attaching (also called "cementing") the soles to the uppers are well known. In the second process, i.e., the direct attachment, the adhesive may be the cast polyurethane minus the blowing agent which is cured with the cast foam as it cures, or it may be a different polyurethane adhesive.

In making the shoe soles, typically the polymer is in a prepackaged form with the isocyanate and prepolymer thereof as one package and the ester with all of the additives as another. Among the additives, the presently disclosed plasticizers are included. A further package may contain the catalyst and the cell control agents (a three package system).

Thus, for selling to shoe manufacturers, the mixing of the material is done on the premises shortly prior to casting, but the packages are purchased typically in a separate form in proportion suitable for practice of the invention, i.e., for making the shoe soles as well as for obtaining the final product. Consequently, as part of this invention, the "kit" form or "package" form combinations of the components are within the scope of this invention. Hence, the prepackage shoe sole polyester and plasticizer composition, as a composition of matter, by itself is believed to be novel as is its combination with the cell control agent and catalyst and further, in a "package" or "kit" form with the isocyanate component precursor combination thereof.

What is claimed is:

1. In a process of preparing an integral-skin microcellular polyester base polyurethane elastomer, the improvement comprising reacting a hydroxyl-terminated aliphatic polyester, an isocyanate and/or an isocyanate prepolymer of an aliphatic or an aromatic glycol and/or triol, in the presence of a blowing agent and at least one plasticizer of the following formulae:

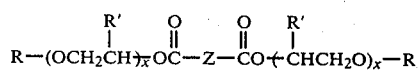

a.

or mixtures thereof,
wherein R may be different for each position and is alkyl of from 1 to 12 carbon atoms, aryl, alkylated aralkyl, wherein the alkyl moieties may be up to 4 carbon atoms, R' may be different in each of the repeating units, and is H or alkyl up to 4 carbon atoms; Z is alkylene of 2 to 10 carbon atoms; arylene and substituted arylene, aralkylene, wherein the alkylene portion thereof is up to 4 carbon atoms; cycloalkylene of 5 to 8 carbon atoms; and x stands for an integer from 1 to 5;

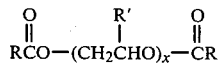 b.

or mixtures thereof,
wherein R may be different for each position and is alkyl from 1 to 12 carbon atoms; aryl; substituted aryl; aralkyl; alkaryl wherein the "alk" or alkyl portion of each is up to 4 carbon atoms; or cycloalkyl of 5 to 8 carbon atoms in the ring; and R may be different in each repeating unit and is hydrogen or alkyl from 1 to 4 carbon atoms; and x stands for an integer from 2 to 10;

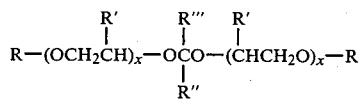 c.

or mixtures thereof,
wherein R may be different for each of the positions and is alkyl of from 1 to 12 carbon atoms; aryl; substituted aryl; alkaryl wherein the "alk" moiety is up to 4 carbon atoms; cycloalkyl of 5 to 8 carbon atoms in the ring; R' is H, or alkyl from 1 to 4 carbon atoms in the ring; R" and R"' are H, or alkyl from 1 to 4 carbon atoms; and x stands for an integer from 1 to 5; or

 d.

or mixtures thereof,
wherein R may be different for each position and is alkyl from 1 to 12 carbon atoms; arly; substituted aryl; aralkyl or alkaryl wherein the "alk" or alkyl portion of each is up to 4 carbon atoms; cycloalkyl of 5 to 8 carbon atoms in the ring; and R' is H or alkyl or substituted alkyl of up to 4 carbon atoms; and x stands for an integer from 1 to 10.

2. The method as defined in claim 1, wherein the reaction is conducted in the presence of a catalyst and a cell regulating agent.

3. The method as defined in claim 1, wherein the catalyst is a tertiary amine; an organo tin compound; an organo mercury compound; a sila-amine; a Mannich base; an ammonium compound; an alkali metal hydroxide, a phenolate or alcoholate; a trazine; or a mixture thereof.

4. The process as defined in claim 1, wherein the reaction is carried out in the presence of an emulsifier, a foam stabilizer, or a cell regulating agent.

5. The process as defined in claim 4, wherein the cell regulating agent is a poly dimethyl siloxane, a poly phenyl methyl siloxane, a mineral oil, a polyether polyol of a copolymer or a block copolymer of ethylene and propylene oxide or mixtures thereof.

6. The method as defined in claim 5, wherein the cell regulating agent is a poly dimethyl siloxane of a viscosity from 5 to 100 centistokes at 25° C.

7. The method as defined in claim 1, wherein the blowing agent is a halogenated hydrocarbon, a low boiling ether, a ketone or a mixture thereof.

8. The method as defined in claim 7, wherein the halogenated hydrocarbon is a fluorocarbon selected from the group consisting of trichlorofluoromethane, 1,1-difluoro-1-chloro-2-fluoro-2-dichloro-ethane, difluorodichloromethane, and a mixture thereof.

9. The process as defined in claim 1, wherein the plasticizer is a compound of the formula:

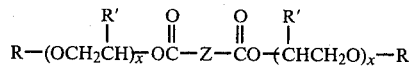

or mixtures thereof,
wherein R may be different for each position and is alkyl of from 1 to 6 carbon atoms, R' is H, or methyl, Z is alkylene of 4 to 10 carbon atoms, arylene, or alalkylene, and x stands for an integer from 1 to 5.

10. The process as defined in claim 1, wherein the plasticizer compound further includes tricarboxylates substituted with

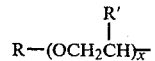

as defined in claim 1.

11. The process as defined in claim 1, wherein the plasticizer is a compound of the formula:

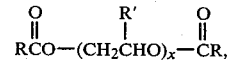

or mixtures thereof,
wherein R may be different for each position and is alkyl of from 5 to 10 carbon atoms, R' is H, or methyl, and x stands for an integer from 2 to 10.

12. The process as defined in claim 1, wherein the plasticizer compound further includes triesters of monocarboxylic acids and trifunctional polyoxyalkylene triols of glycerol or trimethylol propane, wherein the monocarboxylic acid is as defined for compound b.

13. The process as defined in claim 12, wherein the monocarboxylic acid ester is 2-ethyl hexanoate of ethylene or propylene oxide adduct of glycerol or trimethylol propane having a molecular weight from 200 to 500.

14. The process as defined in claim 1, wherein the plasticizer is a compound of the formula:

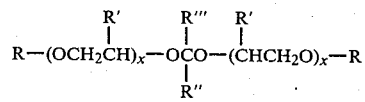

or mixtures thereof,
wherein R may be different for each position and is alkyl from 1 to 8 carbon atoms, aryl, substituted aryl, aralkyl; cyclohexyl; R is H, methyl, or phenyl; R" and R"' are H, or methyl, and x stands for an integer from 1 to 5.

15. As an isocyanate curable composition, for an integral-skin polyurethane elastomer, comprised of a hydroxy-terminated polyester in an admixture of 100 parts of polyester and 5 to 30 parts, by weight, of at least one plasticizer of the following formulae:

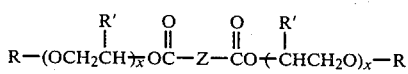 a.

or mixtures thereof, wherein R may be different for each position and is alkyl of from 1 to 12 carbon atoms, aryl, alkylated aralkyl, wherein the alkyl moieties may be up to 4 carbon atoms, R' may be different in each of the repeating units, and is H or alkyl of up to 4 carbon atoms; Z is alkylene of 2 to 10 carbon atoms; arylene and substituted arylene, aralkylene, wherein the alkylene portion thereof is up to 4 carbon atoms; cycloalkylene of 5 to 8 carbon atoms; and x stands for an integer from 1 to 5;

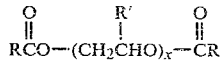   b.

or mixtures thereof,
wherein R may be different for each position and is alkyl from 1 to 12 carbon atoms; aryl; substituted aryl; aralkyl; alkaryl wherein the "alk" or alkyl portion of each is of up to 4 carbon atoms; or cycloalkyl of 5 to 8 carbon atoms in the ring; and R may be different in each repeating unit or is hydrogen or alkyl of 1 to 4 carbon atoms; and x stands for an integer from 2 to 10;

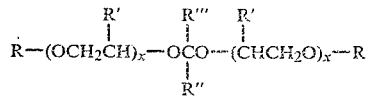   c.

or mixtures thereof,
wherein R may be different for each position and is alkyl of from 1 to 12 carbon atoms; aryl; substituted aryl; alkaryl wherein the "alk" moiety is up to 4 carbon atoms; cycloalkyl of 5 to 8 carbon atoms in the ring; R' is H or alkyl of 1 to 4 carbon atoms; R'' and R''' are H, or alkyl from 1 to 4 carbon atoms; and x stands for an integer from 1 to 5; or

   d.

or mixtures thereof,
wherein R may be different for each position and is alkyl from 1 to 12 carbon atoms; aryl; substituted aryl; aralkyl or alkaryl wherein the "alk" or alkyl portion of each is up to 4 carbon atoms; cycloalkyl of 5 to 8 carbon atoms in the ring; and R' is H or alkyl or substituted alkyl of up to 4 carbon atoms; and x stands for an integer from 1 to 10.

16. The composition as defined in claim 15, wherein the same further includes a polydimethyl siloxane, a poly phenyl methyl siloxane, a mineral oil, a polyether polyol of a copolymer or a block copolymer or ethylene and propylene oxide or mixtures thereof.

17. The composition as defined in claim 16, wherein the same further includes 0.02 to 0.5%, by weight, based on all components in said polyester composition, poly dimethyl siloxane or poly phenyl methyl siloxane.

18. The composition as defined in claim 16, wherein the same further includes a polyether polyol of a copolymer or a block copolymer of ethylene and propylene oxide, or a mixture thereof.

19. The composition as defined in claims 17 or 18, wherein the same further includes a catalyst a tertiary amine; an organo tin compound; an organo mercury compound; a sila-amine; a Mannich base; an ammonium compound; an alkali metal hydroxide, phenolate, or alcoholate; a triazine; or a mixture thereof.

20. A two-component combination for curable integral-skin polyurethane elastomers which comprises component A and component B, wherein A is a hydroxy-terminated aliphatic polyester composition of at least 100 parts of polyester and 5 to 30 parts, by weight, of at least one plasticizer of the formulae:

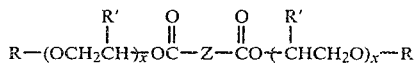   a.

or mixture thereof,
wherein R may be different for each position and is alkyl of from 1 to 12 carbon atoms, aryl, alkylated aralkyl, wherein the alkyl moieties may be up to 4 carbon atoms, R' may be different in each of the repeating units and is H or alkyl up to 4 carbon atoms; Z is alkylene of 2 to 10 carbon atoms; arylene and substituted arylene, aralkylene, wherein the alkylene portion thereof is up to 4 carbon atoms; cycloalkylene of 5 to 8 carbon atoms; and x stands for an integer from 1 to 5;

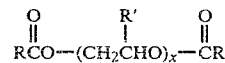   b.

or mixtures thereof,
wherein R may be different for each position and is alkyl from 1 to 12 carbon atoms; aryl; substituted aryl; aralkyl; alkaryl wherein the "alk" or alkyl portion of each is of up to 4 carbon atoms or cycloalkyl of 5 to 8 carbon atoms in the ring; and R may be different in each repeating unit and is hydrogen or alkyl of 1 to 4 carbon atoms; and x stands for an integer from 2 to 10;

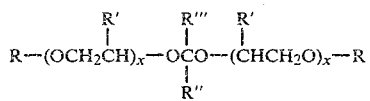   c.

or mixtures thereof,
wherein R may be different for each position and is alkyl of from 1 to 12 carbon atoms; aryl; substituted aryl; alkaryl wherein the "alk" moiety is up to 4 carbon atoms; cycloalkyl of 5 to 8 carbon atoms in the ring; R' is H, methyl or ethyl; R'' and R''' are H, or alkyl from 1 to 4 carbon atoms; and x stands for an integer from 1 to 5; or

   d.

or mixtures thereof,
wherein R may be different for each position and is alkyl from 1 to 12 carbon atoms; aryl; substituted aryl; aralkyl or alkaryl wherein the "alk" or alkyl portion of each is up to 4 carbon atoms; cycloalkyl of 5 to 8 carbon atoms in the ring; and R' is H or alkyl or substituted alkyl of up to 4 carbon atoms; and x stands for an integer from 1 to 10; and wherein B is an isocyanate and/or an isocyanate prepolymer of an aromatic or an aliphatic glycol or triol.

21. The two-component combination as defined in claim 20, wherein component A further includes a poly dimethyl siloxane, a poly phenyl methyl siloxane, a mineral oil, a polyether polyol of a copolymer or a block copolymer of ethylene and propylene oxide or mixtures thereof.

22. The separate package component combination as defined in claim 21, wherein component A further includes 0.02 to 0.5%, by weight, based on all components in said polyester composition, poly dimethyl siloxane or poly phenyl methyl siloxane.

23. The two-component combination as defined in claims 20, 21, or 22, wherein component A further includes 0.02 to 0.5%, by weight, based on all components in said polyester composition, a tertiary amine; an organo tin compound; an organo mercury compound; a sila-amine; a Mannich base; an ammonium compound; an alkali metal hydroxide, phenolate, or alcholate; a triazine; or a mixture thereof.

24. A cured microporous elastomer of the elastomer precursors, as defined in claim 20.

25. A cured microporous elastomer of the elastomer precursors as defined in claim 21.

26. As an article of manufacture, a cast shoe sole attached to a shoe upper comprising an integral-skin, microcellular polyester based polyurethane elastomer, wherein said elastomer is of a specific gravity of 0.06 to 0.9 gm/cm$^3$, and a cell size from 30 to 1000 cells/cm, with an elastomer skin of a thickness of 0.5 to 4 mm, of a cured composition as defined in claim 20.

27. As an article of manufacture, a cast shoe sole attached to a shoe upper comprising an integral-skin, microcellular polyester based polyurethane elastomer, wherein said elastomer is of a specific gravity of 0.06 to 0.9 gm/cm$^3$, and a cell size from 30 to 1000 cells/cm, with an elastomer skin of a thickness of 0.5 to 4 mm, of a cured composition as defined in claim 21.

* * * * *